Feb. 27, 1934.  F. E. WOLCOTT ET AL  1,948,739

TOASTER

Filed Aug. 27, 1929    3 Sheets-Sheet 1

INVENTORS
FRANK E. WOLCOTT
AND LOUIS V. LUCIA

BY

ATTORNEY.

Feb. 27, 1934.  F. E. WOLCOTT ET AL  1,948,739
TOASTER
Filed Aug. 27, 1929   3 Sheets-Sheet 2

INVENTORS
FRANK E. WOLCOTT
AND LOUIS V. LUCIA
BY
ATTORNEY.

Feb. 27, 1934.　　F. E. WOLCOTT ET AL　　1,948,739
TOASTER
Filed Aug. 27, 1929　　3 Sheets-Sheet 3

INVENTORS
FRANK E. WOLCOTT
AND LOUIS V. LUCIA.
BY
ATTORNEY.

Patented Feb. 27, 1934

1,948,739

UNITED STATES PATENT OFFICE 1,948,739

TOASTER

Frank E. Wolcott, West Hartford, and Louis V. Lucia, Hartford, Conn., assignors to The Beardsley & Wolcott Mfg. Co., a corporation of Connecticut Application August 27, 1929. Serial No. 388,756

7 Claims. (Cl. 53—5)

This invention relates to toasters.

It has among its objects to provide an improved toaster. A further object is to provide an improved toaster of the vertical type adapted to receive the bread at the top and discharge the toast at the bottom, and having improved provision for effectually preventing sticking and consequent burning of the bread, and insuring a proper discharge thereof irrespective of variations in size of the slices inserted. A still further object of the invention is to provide such an improved toaster having improved actuating mechanism associated with the discharging mechanism, and also automatically operative through improved connections to adjustable timing mechanism so that, save for the setting of the controlling mechanism, it is only necessary for the user to insert the bread slice at the top and remove the toast from the bottom. Further objects of the invention are to provide such a toaster which is of a compact construction and further adapted to be economically manufactured and readily and quickly assembled. These and other objects and advantages of the invention will however, hereinafter more fully appear.

In the accompanying drawings are shown, for purposes of illustration, one embodiment which the invention may assume in practice.

In these drawings:—

Figure 1:
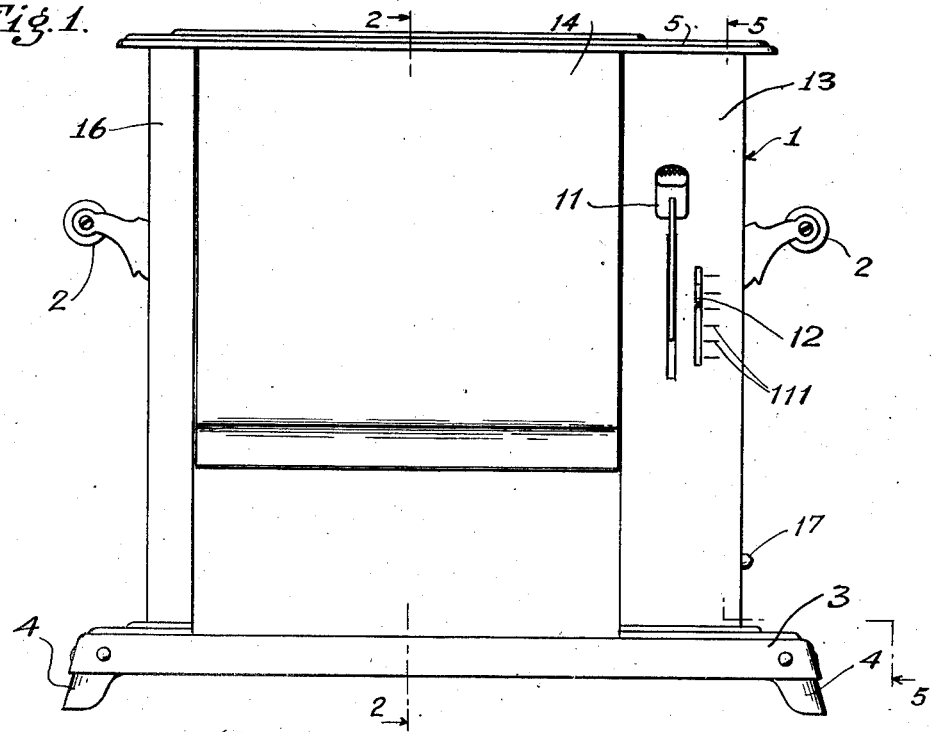
Figure 1 is a side elevation of this form of the improved toaster.

In this illustrative construction, a toaster frame, generally indicated at 1 and provided with suitable end handles 2, is mounted on a suitable base 3 having insulating feet 4, and is provided with a cover 5 having a top toast inlet aperture 6, the construction being such that the bread inserted in this inlet is adapted to be discharged at the bottom into a side outlet 7 after it has been toasted, herein by vertical heating elements disposed with a stationary grid 8 and a swinging grid 9 and while the bread is supported on a support 10, and the mechanism further being controlled by suitable controlling and timing mechanism including an adjusting or actuating member 11 and an adjustable timing member 12.

Figure 3:
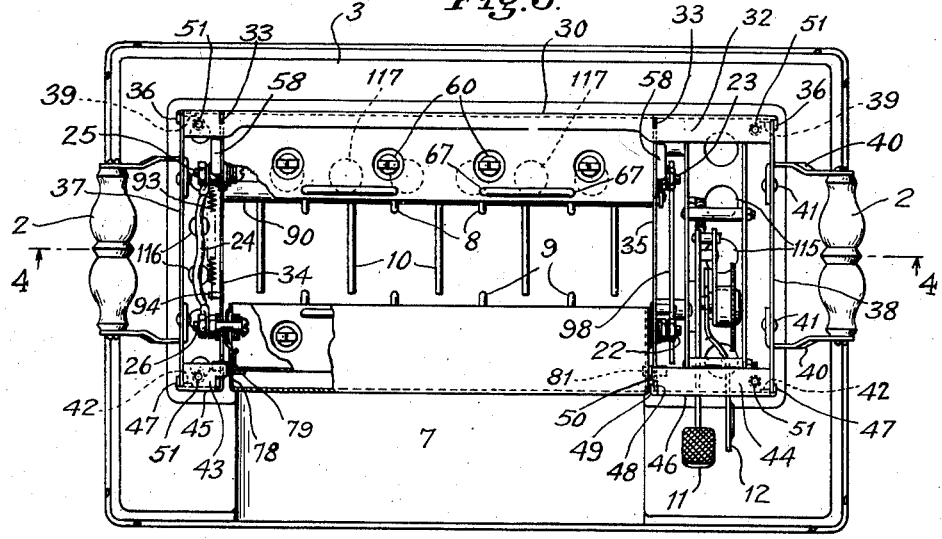
Fig. 3 is a plan view with the cover removed and other parts broken away and shown in section to facilitate illustration.
Figure 4:
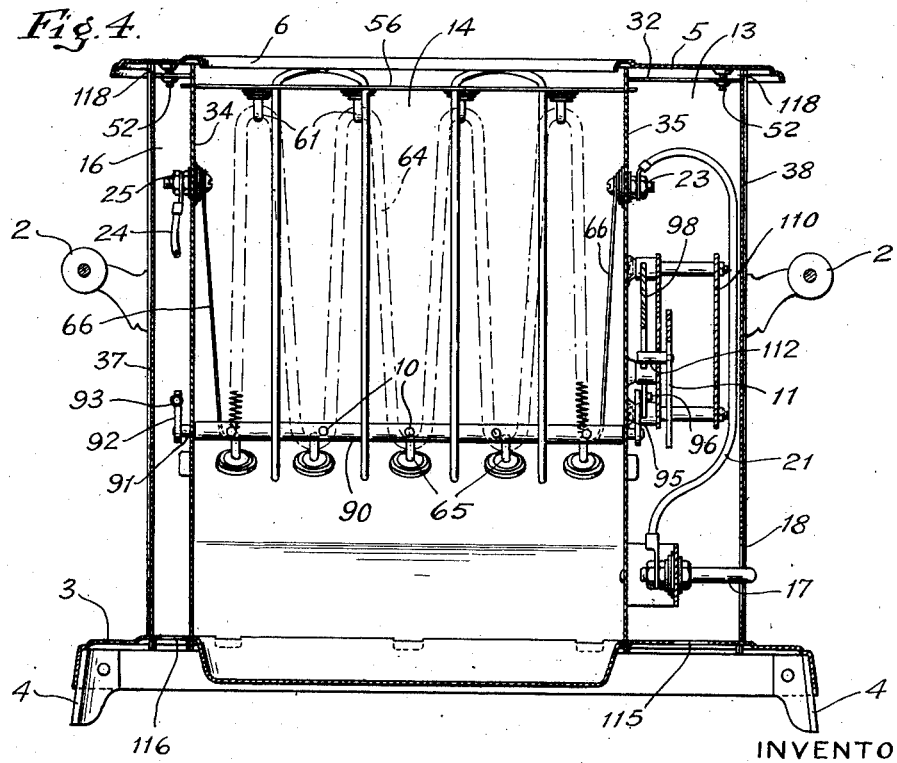
Fig. 4 is a longitudinal sectional view on line 4—4 of Fig. 1.
Figure 5:
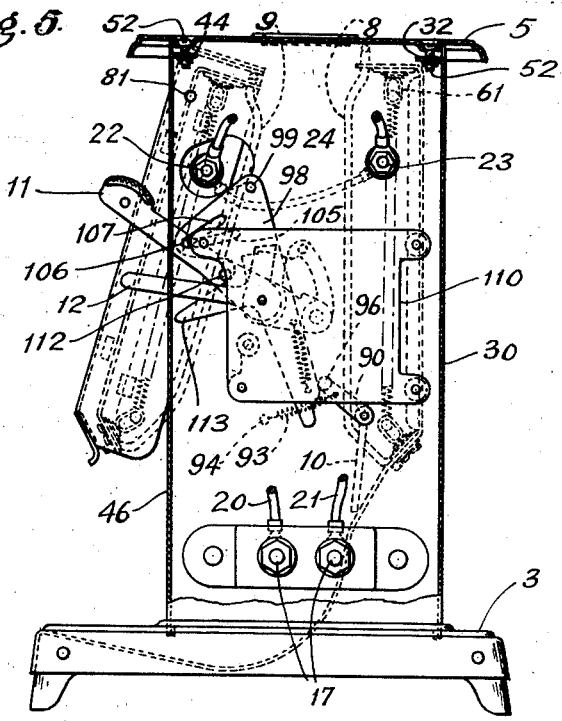
Fig. 5 is a vertical sectional view on line 5—5 of Fig. 1, the swinging heater carrier being shown in its toast discharging position.
Figure 6:
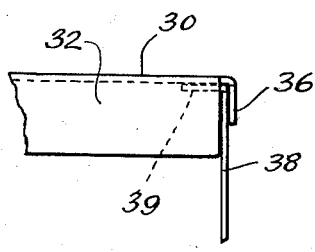
Fig. 6 is a detail view of the corner connections of the back plate.
Figure 7:
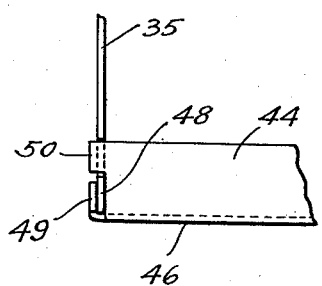
Fig. 7 is a detail view of the inside corner connections of the front plates.

Referring first generally to the frame 1 and the electrical connections, it will be noted that the frame is substantially smaller in cross-section than the base 3, and disposed closely adjacent the back thereof, as shown in Fig. 3, in such manner as to provide a relatively wide support for the discharged toast beneath the swinging member 9. Further, it will be noted that the frame 1 is divided into 3 sections, one an end section 13, housing the controlling and timing mechanism, the next a larger section 14, housing the heating elements and the grids 8 and 9 and substantially spaced above the toast support 7, and the other, another end portion 16, smaller than the portion 13, and like the latter, carrying a handle member 2 on its end wall. Attention is also directed to the fact that the terminal connections, which include usual terminal plugs 17, are disposed within the portion 13, and suitably fixed to the adjacent end wall of the portion 14 at the base of the latter, while the terminals 17 are accessible through a suitable aperture 18 in the base of the end wall of the section 13 which provides a suitable guard for the plug. It will also be noted that conductors 20 and 21 extend upward from the terminals 17 and are connected by suitable binding posts 22 and 23 to the heating units disposed in the grid elements 8 and 9 and hereinafter described, while a conductor 24 of substantial length and normally depending, as indicated in dotted lines in Fig. 5, is similarly connected between binding posts 25 and 26 at the other ends of the heating elements, and disposed within the frame portion 16.

Considering more particularly the structure of the frame, it will be noted that the same comprises a back plate 30 having suitable feet 31 received in corresponding apertures in the base 3 and a laterally extending upper flange 32 suitably apertured to receive upstanding lugs 33 on vertical plates 34 and 35 at the opposite ends of the portion 14. This plate 30 is herein also provided with projections 36 on its ends adapted to fit around the outer or end plates 37 and 38 of the portions 16 and 13, while these latter end plates are also provided with projecting portions 39 extending inside the plate 30 under the flange 32. These plates 37 and 38 are also suitably apertured to permit extensions on the side members 40 of the handles 2 to extend through the same and be bent over on the inside and suitably attached by rivets 41. At their front ends these plates 37 and 38 are also provided with projections 42, similar to the projections 39, and extending under top flanges 43 and 44 on front plates 45 and 46, respectively forming the fronts of portions 16 and 13 and, like the back plate 30, also provided with projections 47 corresponding to the projections 36 on that plate. Attention is here also directed to the fact that the plate 35 is also connected to the plate 46 and has an upward projection 48 extending through a suitable aperture in the corner of that plate, while a projection 49 is provided on the plate 46 generally similar to its projection 47, and the flange 46 also has a projection 50 lying in a corresponding aperture in the top of the plate 35, while the corresponding end of the plate 34 is similarly connected to the plate 45. It being understood that the several parts are provided with depending feet similar to the feet 31, receivable in suitable apertures in the base plate 3, it will be evident that all of the vertical frame members 34, 35, 37 and 38 may thus be inserted in these apertures in vertical position and the plates 30, 45 and 46 thereafter inserted vertically in position and interlocked therewith readily and quickly. Attention is, moreover directed to the fact that the top horizontal flanges 32, 43 and 44 are apertured, and if desired suitably threaded, as at 51, at the corners of the device, in such manner that screws 52, insertable through the top of the cover plate 5, hold the frame together securely while permitting access to be had to the enclosed structure whenever desired upon removing these screws and bending back the necessary projections.

Referring next to the stationary heater unit carrying the grids 8, it will be noted that this is disposed between the plates 34 and 35, and that it comprises a plate 55 forming a frame member and having a top flange 56 at right angles thereto and a depending angularly disposed base flange portion 57, hereinafter more fully described, which herein also forms a part of the bottom of the toast outlet 7. Further, it will be noted that the flange 56 is provided with laterally extending wide lugs 58 receivable in corresponding apertures in the plates 34 and 35 and forming a support and positioning means for the frame 55, while the latter is also provided with vertical flanges 59 on its vertical edges inside the plates 34 and 35 and abutting against the latter and stiffening and strengthening the structure. It will also be observed that the flange 56 is provided with suitable insulating bushings 60 spaced along the same and from the back wall thereof and carrying usual pendant loop 61 having their usual divided ends 62 adapted to be expanded, and carrying in their pendant portions the ends of loops in a resistance element 64 of any suitable type. Corresponding supports for the resistance element are also provided on the depending flange portion 57, as generally indicated at 65. Also, the opposite ends of the resistance element 64 are connected through conductors 66 with the binding posts 23 and 25, which are fixed to and suitably insulated from the end plates 34 and 35. Attention is also directed to the fact that the flange 56 is provided in its front edge with a series of small apertures 67 arranged in pairs and adapted to receive from above hairpin-like grids or guards 8, which engage the bread and are disposed between the same and the resistance element 64. Herein, it will also be noted that these members 8 are provided with outwardly deflected portions 69 intermediate their ends, which actually engage the bread and are vertically disposed, while at their lower ends they are provided with reversely bent portions 70 having bent feet 71 adapted to be snapped in corresponding apertures in the portion 57 in such manner as to hold the same securely in position.

Cooperating with this stationary unit is the swinging unit carrying the grids 9. As shown, this unit comprises a plate or frame member 75 corresponding in general to the member 55 previously described in so far as the resistance supports, resistance element, and grid members are concerned. However, this member, instead of being provided with lugs 58, is provided within an outer frame or casing member 77 having inwardly extending end flanges 78 parallel to the lugs 76. These flanges 78 are in turn provided with a series of inwardly bent lugs 79 outside the plate 75 and another series of lugs 80, inside the plate and adapted to be received in corresponding notches in the flange 76 thereon and cooperate with the lugs 79 in holding the plate in position within the outer or enclosing plate. This outer plate is herein also pivotally supported near its top, as for example on pins 81 carried in its end flanges 78 and the adjacent walls 34, 35, the pivot preferably, as shown, being located toward the front of the unit so that the plate with the heating element and grids carried thereby may swing about this pivot from the full line position shown in Fig. 2 to the dotted line position shown in Fig. 5. It will here also be noted that the plate 77 terminates substantially above the portion 57 providing the bottom of the toast outlet 7, in such manner as to provide a relatively high aperture extending the width of the section 14, and that in this construction the same is also provided with a rounded depending end 82 forming a continuation of outwardly curved deflected portions 83 on the grids 9 which further increase the possible passage room at the bottom of the swinging member. Attention is also directed to the fact that each of the flanges 78 on the plate 77 carries, suitably insulated therefrom, the binding posts 22 and 26, which are connected to the conductors 20 and 24, respectively, and that suitable slots 84 are provided in the plates 34 and 35 in order to enable these binding posts to swing when the frame is swung.

Figure 2:
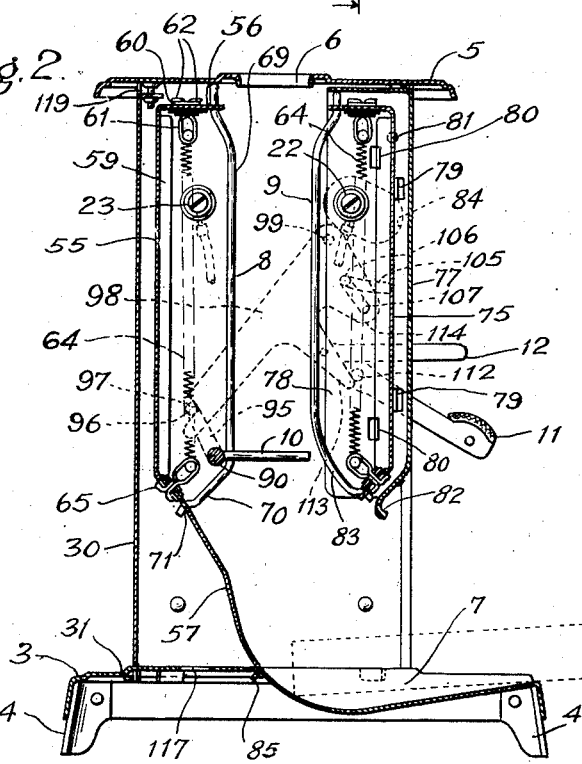
Fig. 2 is a vertical sectional view on line 2—2 of Fig. 1.

Considering the two heater carrying elements together, it will thus be noted that a construction is provided wherein the unit carrying the grids 8 and the swinging unit carrying the grids 9 may be assembled with the plates 34 and 35 as a unit, and this unit then assembled with the end plates 37 and 38 on the base 3 in the manner previously described in connection with the several plates. Attention is here also directed to the fact that the depending flange portion 57 on the plate 55 is provided with a sloping portion sloping out approximately to the vertical plane of the engaging surfaces of the grids 8 and beneath the latter, and then downward in a gentle curve and outward and upward as shown in Fig. 2 in such manner as to provide an effective toast deflecting surface. It will also be noted that this member 57 is herein provided with a series of suitable lugs 85, engageable with the base plate, all in such manner as to provide a toast receptacle or trough seated in a suitable aperture in the plate 3 and adapted to be suitably interlocked with the latter plate by said lugs in such manner as to hold the connected upper parts to the base.

Cooperating with the mechanism heretofore described, is improved mechanism for supporting the toast in position between the stationary and swinging heating elements, and releasing the same so that it may move by gravity into the receptacle 7. Herein, this includes a series of supporting members 10 projecting below the stationary heating element and between the grids 8, and adapted to occupy the bread supporting position illustrated in full lines in Fig. 2 or the discharging position indicated in dotted lines in that figure. Herein, these members 10 are carried on a shaft 90 having reduced end portions 91 suitably journaled in the end plates 34 and 35. One of these reduced portions, herein that in the portion 16, carries a crank arm 92, which is in turn connected by a coiled spring 93 to a suitable point 94 on the casing wall, so that the spring is under tension when the member 10 is in the full line position shown. On the opposite reduced end 91 of this shaft 90 is a similar crank 95 which has a laterally extending lug 96 adapted to be engaged in the down position of the portions 10 by a suitable notch 97 on an actuating member 98, herein pivoted at 99 in the portion 13. Thus it will be observed that when this member 98 is swung about its pivot 99 clockwise from a position at the right of that illustrated in Fig. 2, its notch 97 will engage the projection 96 on the crank 95 and swing the portions 10 from the down position of Fig. 5 into the up or full line position shown in Fig. 2. Thus the bread may be held between the heating elements as long as may be desired and released upon a reverse movement of the member 98, whereupon the spring 93 will return the members 10 to their open or dotted line position.

Associated with this mechanism is also improved mechanism for swinging the swinging heating element carried in the frame 75, 77. Herein this includes a connection between the swinging lever 98 and the swinging heater carrying frame adapted to cause the latter to swing out from the full line position illustrated in Fig. 2, to the full line position illustrated in Fig. 5, when the toast supporting means 10 is moved from toast supporting to toast releasing position. More particularly, it will be noted that an arcuate slot 105 is provided in the plate 35 substantially below the pivot 81, while a pin 106 protrudes from the adjacent side flange 78 of the swinging member into this slot. Moreover, it will be noted that the lever 98 is provided with a straight slot 107 extending downwardly at an angle relative to the slot 105 when the parts are in the position shown in Fig. 2, and which also has the pin 106 projecting into one end of it in that position. Thus, when, with the parts in the position shown in Fig. 2, the lever 98 is moved to the right about its pivot 99, the pin 106 is moved thereby from one end of the slot 105 to the other in such manner as to cause the heater unit to swing about its pivot 81 from the position shown in Fig. 2, to the position shown in Fig. 5, and thereby swing the grids 9 away from the toast at the same time that the supports 10 are swung out from underneath the latter and consequently insure the certain discharge of the toast, irrespective of the size of the slice or any tendency of the same to cling or stick to the grids. Attention is also directed to the fact that an idler pin and slot (not shown), corresponding to 106 and 105, are provided on the opposite side of the swinging frame to balance the mechanism.

Associated with the mechanism for swinging the frame 75, 77, and releasing the support 10, we have also shown automatic controlling mechanism whereby the lever 98 may be operated automatically after a predetermined toasting interval to actuate the discharging members 10 and swing the swinging frame. Herein, this mechanism includes a timing device in the form of a unit and generally indicated at 110. Since this timing unit is a standard device, and per se does not enter into the present invention, the same has not been illustrated in detail, it being considered sufficient to state that the same includes a usual form of clock mechanism carried on the plate 35, within the portion 13 and suitably spaced from the lever 98, and that its actuating and controlling mechanism includes a setting lever 12 extending through the front of the plate 46 and vertically movable relative to graduations 111 indicating different time intervals, and a starting lever 11 movable parallel to the lever 12 and adapted to wind and start the clock mechanism when moved about its pivot, and to move gradually back to its starting position as the clock mechanism operates, and suddenly spring back to its starting position when the selected interval has elapsed. Herein, however, a laterally extending pin 112 is provided on this lever 11, and cooperating projections 113 and 114 on the lever 98. One of these projections 113 herein is in the form of an elongated projection having a sloping upper face which is adapted to be engaged by the pin 112 on the lever 11 when the latter is depressed, while the other projection 114 is spaced above the projection 113 and adapted to be engaged by the pin 113, as the lever 11 snaps back to its initial position upon the expiration of any selected time interval of operation. It will also be noted that a co-operating coiled spring 98' is connected between the lower end of the member 98 and the inner end of lever 11. Thus, it will be observed that when the lever 11 is moved to starting position, the pin 112 is moved with it in such manner as to depress the projection 113 and cause the notch 97 on the lever 98 to engage the lug 96 on the crank 95, and at the same time, move the swinging heater frame from the position shown in Fig. 5 to the position shown in Fig. 2, whereas, the quick return movement of the pin 112 to initial position will cause it to engage the projection 114, and accordingly swing the member 98 in such manner as not only to release the lug 96 and thereby result in the movement of the member 10 to inoperative position, but also cause the swinging heater frame to swing out about its pivot 81 to the open position illustrated in Fig. 5 in such manner that the toast will surely drop into the receptacle 7.

Attention is here also directed to the fact that the base plate 3 is provided with a plurality of holes 115, 116 in its upper surface, respectively disposed beneath the frame sections 13 and 16 and extending lengthwise of those sections, and with a further series of holes 117 extending along the stationary grid. Thus, it will be noted that since air outlets 118 and 119 are provided at the top and beneath the cover plate 5, means are provided for maintaining a circulation of air up through the sections 13 and 16 and between the plates 30 and 55 in such manner as to prevent discoloration of the external casing members. Similarly it will be noted that since the plate 75 is spaced from its outer plate 77 throughout its length, air may similarly flow upward between these plates and thus protect that outer plate while the spacing of the top of the plate 77 from the top of the cover plate 5 further assists in preventing discoloration of the former.

As a result of this improved construction, it will be noted that not only is necessity for handling of the toast minimized, it only being necessary for the user to insert the bread and remove it, but that all tendency for the toast to stick in the toaster is prevented, and means provided for insuring the dropping out of the toast, irrespective of the size of the slice or its tendency to stick to the grids. Attention is also directed to the fact that in the outwardly swung position of the swung frame, the latter is disposed over the toast in the receptacle 7 in such manner as to assist in keeping the same warm. It will further be observed that in this construction the automatic mechanism operates not only to insure a proper toasting period, but that it is such as to produce a very convenient mechanism utilizing only two control members, one, the time interval determining member, and the other, an actuating member. Attention is also directed to the improved structure which enables the device to be manufactured and assembled with a minimum of expense, and to the rugged character of the mechanism which enables it to operate with a minimum of danger of derangement in service. These and other advantages of the improved construction will, however, be clearly apparent to those skilled in the art.

While one embodiment of the invention has been described specifically herein, it will be understood that this embodiment has been chosen for purposes of illustration, and that the invention without departing from its spirit may be modified and embodied in various other forms, all of which it is intended to include within the scope of the appended claims.

What we claim as new and desire to secure by Letters Patent is:—

1. In a toaster, a casing having a top inlet and a bottom outlet, a stationary vertical heating member, a movable vertical heating member spaced therefrom, the bread to be toasted being located between said heating members, a bottom support for said toast, and means for shifting said movable heating member outwardly and said bottom support away from said movable heating element to release the toast to permit it to drop by gravity through the botom outlet.

2. In a toaster, a casing having a top inlet and a bottom outlet, a stationary vertical heating member, a movable vertical heating member spaced therefrom, the bread to be toasted being located between said heating members, a bottom support for said toast, and time-controlled means for shifting said movable heating member outwardly and said bottom support at right-angles to said heating element to release the toast to permit it to drop by gravity through the bottom outlet.

3. In a toaster, a casing having a top inlet and a bottom outlet, a stationary vertical heating member, a pivoted vertical heating member spaced therefrom, the bread to be toasted being located between said heating members, a bottom support for said toast, and means for swinging said pivoted heating member outwardly and said bottom support downwardly to release the toast to permit it to drop by gravity through the bottom outlet.

4. In a toaster, a casing having a top inlet and a bottom outlet, a stationary vertical heating member, a pivoted vertical heating member spaced therefrom, the bread to be toasted being located between said heating members, a pivoted bottom support for said toast, and means for swinging said pivoted heating member outwardly and said bottom support downwardly to release the toast to permit it to drop by gravity through the bottom outlet.

5. In a toaster having a top inlet and a bottom outlet, a vertical toasting passage therebetween, means for releasably supporting the bottom of the toast, and means for simultaneously withdrawing said releasable supporting means and swinging one wall of said passage away from the other wall thereof to permit the discharge of said toast by gravity from said passage to said outlet.

6. In a toaster, a casing having a top inlet and a bottom outlet, a stationary vertical heating member, a movable vertical heating member spaced therefrom, the bread to be toasted being located between said heating members, a bottom support for said toast, and means for shifting said movable heating member outwardly and said bottom support downwardly to release the toast to permit it to drop by gravity through the bottom outlet, said movable heating member extending laterally to partially cover the discharged toast for retarding the cooling thereof.

7. In a toaster having a top inlet, a bottom outlet, and a vertical toasting passage therebetween, means at the bottom of said passage for supporting the toast during toasting, means for laterally spreading apart the walls of said passage and withdrawing said supporting means after the toasting is completed to insure the discharge of the toast by gravity and prevent it from sticking in said passage.

FRANK E. WOLCOTT.
LOUIS V. LUCIA.